Figure 1:
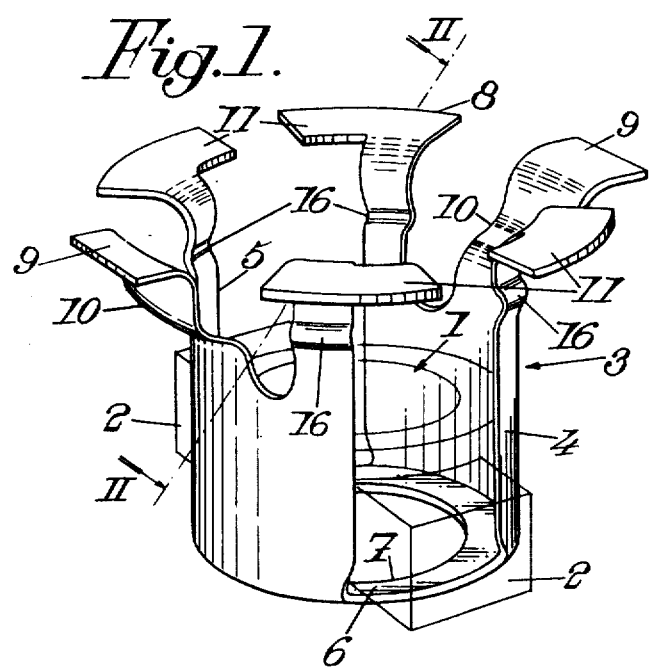

United States Patent [19]

Moryl

[11] 4,250,732
[45] Feb. 17, 1981

[54] APPARATUS FOR MANUFACTURING CAGES FOR SET SCREWS

[75] Inventor: Richard Moryl, Maisons Laffitte, France

[73] Assignee: C.O.M.E.T. Compagnie de Materiel et d'Equipements Techniques, France

[21] Appl. No.: 959,452

[22] Filed: Nov. 13, 1978

Related U.S. Application Data

[62] Division of Ser. No. 815,026, Jul. 12, 1977, abandoned.

[30] Foreign Application Priority Data

Jul. 16, 1976 [FR] France .................. 76 21888

[51] Int. Cl.³ .................................. B21D 17/02
[52] U.S. Cl. ................................ 72/357; 72/370; 411/108; 411/112
[58] Field of Search ............... 72/370, 357, 367, 398; 151/41.7, 41.74, 41.75

[56] References Cited

U.S. PATENT DOCUMENTS

| | | | |
|---|---|---|---|
| 353,929 | 12/1886 | Fitz Gerald | 29/179 |
| 693,179 | 2/1902 | Sneddon | 72/370 |
| 1,046,914 | 12/1912 | Webb | 151/41.75 X |
| 2,375,481 | 5/1945 | Lee | 72/370 |
| 2,832,254 | 4/1958 | Viger | 151/41.74 |
| 2,884,283 | 4/1959 | Korol | 151/41.75 |
| 2,947,081 | 8/1960 | Clevenger | 72/370 |
| 3,122,830 | 3/1964 | Dawson | 72/370 |
| 3,126,935 | 3/1964 | Tuozzo | 151/41.75 |
| 3,398,496 | 8/1968 | Mischke | 151/41.75 |
| 3,503,246 | 3/1970 | Shiokawa | 72/370 |

FOREIGN PATENT DOCUMENTS

| | | | |
|---|---|---|---|
| 81885 | 9/1956 | Denmark | 151/41.7 |
| 1262004 | 4/1961 | France | 151/41.75 |
| 30849 | 1/1965 | Japan | 151/41.7 |
| 175372 | 12/1965 | U.S.S.R. | 72/370 |

*Primary Examiner*—Francis S. Husar
*Assistant Examiner*—Gene P. Crosby
*Attorney, Agent, or Firm*—Larson, Taylor and Hinds

[57] ABSTRACT

The invention concerns metal cages for set screw—cage systems intended to be mounted on a metal sheet accessible from only one of its faces. According to one aspect of the invention, the sidewalls 4 of the cage 3 of such a system are provided with an annular rib 16 projecting radially outwards, the external diameter of cage 3 at the rib 16 being slightly greater than the diameter of the hole 12 in which the cage is engaged, owing to which the cage is axially locked on the metal sheet. Dies are provided for the shaping of cage members. The invention finds application particularly in the fitting out of the bodies of vehicles.

2 Claims, 6 Drawing Figures

APPARATUS FOR MANUFACTURING CAGES FOR SET SCREWS

This is a division of application Ser. No. 815,026 filed July 12, 1977, now abandoned.

The invention relates to systems, formed by a set nut or a stud bolt and a cage, which are placed on a metal sheet from one of its faces and which are meant to receive respectively a bolt or a nut presented on this same face, because in particular of the inaccessibility of the other face due for example to the fact that the metal sheet forms part of a box closed at least partially.

It will be noted once and for all that such systems can comprise either a set nut or a bolt whose head is imprisoned; in what follows only a nut will be described, it being understood that this nut can just as well be replaced by a bolt without in any way modifying the invention.

The invention relates more particularly to those of these systems comprising a nut with two lugs for cooperating with a hole having two notches formed in the metal sheet at the desired place:

and a metal supporting and guiding cage for mounting also in this hole, this cage comprising: a socket split longitudinally by two windows capable of cooperating with the lugs of the nut while allowing axial but not angular movement of this latter; two bosses or angular locking elements formed by two tabs cut out in the wall of the socket and able to cooperate with the notches of the hole formed in the metal sheet after axial introduction of the cage equipped with nut into the hole, then angular movement of this cage, preferably through 90°; and stop means, limiting the penetration of the cage into the hole, constituted by a discontinuous outer collar formed by the free ends of the two tabs and of the wall of the socket bent outwardly, the two said windows being open in the direction of this collar.

Despite their unquestionable interest, these known arrangements have the major disadvantage that, because of the absence of complementary retaining means locking the collar of the cage against the metal sheet, before placing the nut, the cage may be subjected to axial movements capable of disengaging the bosses from the notches of the hole; this disadvantage may be particularly evident when the system is placed in the metal sheet from underneath.

Cages are known, it is true, which are moulded from a plastic material (e.g. "nylon"), of a type very close to the metal cages described above, in which the above disadvantage is eliminated by the presence, on their outer side faces, of annular retaining projections; the formation of these projections does not present a major difficulty since they are obtained at the same time as the walls of the cages during moulding thereof.

Unfortunately, although presenting advantages for numerous applications, the cages made from a plastic material cannot be subjected to very high temperatures and it is not advisable to place them in contact with hot metal sheets or near sources of heat (for example, on a motor vehicle chassis, near the motor or near the exhaust pipe).

On the other hand, the provision of ribs of the kind mentioned on metal cages could not be considered up to the present time because of the difficulties of machining such a projection and because of the lack of appropriate tools.

Moreover, the cylindrical form of revolution of the internal walls of known metal cages gave to the set nut too great a freedom for axial movement; for this reason, when placing such cages into a metal sheet from underneath, the nut fell by gravity towards the aperture of the cage and its lugs, engaging in the indentations of the hole, prevented the 90° rotation of the cage. The operator then had to push the nut back towards the bottom of the cage by means of the end of a tool so as to free the lugs, which caused a loss of time and a needless complication for placing the system.

The invention has as its aim to remedy certain at least of these different disadvantages.

In accordance with the invention, in a metal cage forming part of a set screw-cage system defined in the beginning, the wall of the socket comprises at least an annular rib projecting radially outwards, the transverse section of the socket at this rib being slightly greater than the internal diameter of the hole disregarding the notches intended to coact with said system.

Owing to this arrangement the cage is held by the rib cooperating with the edges of the hole drilled in the metal sheet, in a position in which the lugs of the nut are freed from the indentations of the hole, which allows rotation of said cage to bring it into its final operative position.

It is also advantageous to have moreover recourse to one of the following arrangements:

the axial distance between the rib and the face of the collar turned towards it is at least equal to the thickness of the metal sheet in which is formed the notched hole and at most equal to the axial dimension of a boss;

The rib is presented in the form of an annular flange formed of arcs separated from each other and carried respectively by the parts of the wall of the socket which do not carry the bosses.

An apparatus in accordance with the invention, for manufacturing the metal cage which has just been described, comprises, on the one hand, a matrix formed from two half shells each having a semi-cylindrical recess in the internal face of which are provided a semi-annular groove and at least an indentation capable of cooperating with a corresponding boss of the cage, these two half shells being mounted so as to be able to be separated from each other or brought together into mutual contact, the two recesses forming together a cylindrical cavity of revolution (disregarding the grooves and the indentations), and, on the other hand, a punch cylindrical in revolution whose wall is provided with an annular rib projecting radially at an axial level corresponding to that of the grooves of the matrix.

The process for manufacturing a ribbed metal cage by means of the above apparatus comprises the steps of cutting out a plate of thin metal sheet, stamping this cut out plate in order to obtain a cage provided with two external bosses and a discontinuous external collar.

It is characterized according to the invention in that it comprises the following steps moreover:

the cage thus formed in disposed in a matrix formed by the two half shells separated from each other and each having a semi-cylindrical recess in the internal face of which are provided a semi-annular groove and at least one indentation in which is engaged a corresponding boss of the cage, into the cage is forced a cylindrical punch, in revolution, whose wall is provided with an annular rib projecting radially and situated axially substantially opposite the annular groove of the matrix, the two half shells of the matrix are brought into mutual contact so as to force the side walls of the cage against the punch, the half shells of the matrix are separated from one another, the punch is withdrawn from the cage then ribbed on the outside, and said cage is subjected to heat treatment in order to harden the metal.

Moreover, in a preferred embodiment of the invention, the cage presents a conicity converging slightly towards the collar, the inner diameter of the part of the socket adjacent said collar being slightly smaller than that of the nut.

This arrangement ensures that the nut is held in the bottom of the cage, even when this latter is introduced into the hole from underneath, in an upside down position, and prevents the nut coming close to the opening of the cage and stopping rotation of the cage in the hole to bring the bosses into the notches.

This complementary arrangement then facilitates the placing of the nut-cage system on the metal sheet.

In this cage, in order to obtain the conicity of the cage, the apparatus of the invention comprises furthermore advantageously a second matrix formed from two half shells each having a recess in the form of a semi-truncated cone converging upwards, in the internal face of which are provided a semi-annular groove able to receive the rib of the cage and at least one indentation able to cooperate with a corresponding boss of the cage, these two half shells being mounted so as to be able to be separated from each other or brought into mutual contact, the two united recesses constituting then a cavity, with the shape of a truncated cone in revolution (disregarding impressions and notches) with upwardly directed convergence.

The manufacturing process of such a cage is then completed by the following steps, carried out before the heat treatment of the cage:

the ribbed cage is introduced into a matrix formed from two half shells separated from one another and each having a semi-truncated cone shaped recess converging upwards and in the internal face of which are provided a semi-annular groove and at least one indentation in which engages the corresponding boss of the cage, the two half shells are brought into mutual contact to give the cage the shape of a truncated cone, converging towards the aperture fitted with the collar, and the two half shells of the matrix are separated from one another so as to extract the cage.

Figure 2:
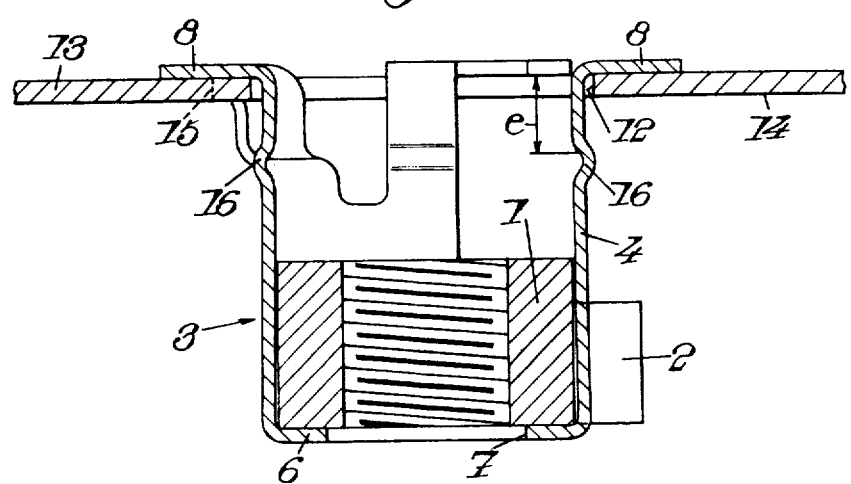

The invention will be better understood from reading the detailed description which follows of one of its preferred embodiments with reference to the accompanying drawings in which:

FIG. 1 represents, in perspective, a set screw-cage system provided according to the invention, FIG. 2 shows in section (along line II—II of FIG. 1) the above system placed on a metal sheet, and FIGS. 3 to 6 show different steps of manufacture of a cage for the above system, using an apparatus in accordance with the invention shown schematically.

The set screw-cage system concerned by the invention comprises, on the one hand, a nut 1 provided with two lugs 2 and, on the other hand, a metal cage 3 of generally substantially tubular shape.

Cage 3 is essentially formed by a socket 4 having extending over the whole of its height two windows 5 whose width is a little greater than that of lugs 2, this socket being closed at one of its ends by bottom 6 preferably axially drilled to provide an aperture 7.

The two windows 5 are open opposite bottom 6 and the edge of the socket is bent outwards so as to form a discontinuous peripheral collar 8.

Moreover two tabs 9, preferably staggered substantially by 90° with respect to the windows, are cut out in the upper part of the wall and are deformed so as to constitute bosses 10 for preventing rotation of the cage once it has been put into place on the metal sheet.

It is advantageous that the parts of the collar situated on both sides of the windows have tongues 11 partially closing the upper openings of said windows.

With these arrangements, since lugs 2 of nut 1 are engaged in windows 5, the nut can only slide axially in the cage, the cooperation between the lugs 2 and windows 5 preventing its rotation and the presence of bottom 6 and tongues 11 preventing it from leaving the cage.

The set screw-cage system which has just been described is intended to be placed in a hole 12 (FIG. 2) drilled in a metal sheet 13, to the rear face of which the operator has no access, particularly if this metal sheet forms part of a closed box (not shown).

Hole 12 is provided with two notches 15 diametrically opposed for receiving respectively bosses 10 of the cage in the mounting position of the system.

In accordance with a first aspect of the invention, the socket 4 of the cage is provided with an annular rib 16 projecting radially outwards, the outer diameter of the socket at the rib being slightly greater than the internal diameter of hole 12 (disregarding notches 15).

In the cage where the nut-cage system is always mounted on metal sheets of identical thicknesses, the axial distance e between the rib and the face of the collar turned towards it can be selected equal to the thickness of the metal sheets; once in place the cage is jammed on the metal sheet and it cannot be axially moved.

However, it is interesting to be able to mount a given type of cage-nut system on metal sheets of different thicknesses; said distance e must then correspond to the maximum thickness of the metal sheets on which the system may be mounted.

When the system is mounted on a metal sheet having a thickness less than e, the cage is likely to effect axial movements of small amplitude. In this case, so as to prevent the bosses 10 from escaping from the notches 15, it is desirable that this distance e is at least equal to the thickness of the metal sheet and at most equal to the axial dimension of bosses 10.

As can be seen in FIG. 1, rib 16 is not continuous but is in fact formed by a series of arcs spread out on the periphery of the socket because of the cutting out of windows 5 and tabs 9 from which are formed bosses 10.

A second arrangement which will now be described enables the screw to be held adjacent the bottom of the cage so as to facilitate the placing of the system on the metal sheet.

In the cage-nut systems of the prior art, the cage was cylindrical in revolution and the nut could freely slide axially inside said cage.

The disadvantage of this arrangement was that when the system was turned upside down to be mounted on a metal sheet from underneath, the nut fell by gravity towards the aperture of the cage and the lugs, which then were engaged in the indentations of the hole, prevented the operator from turning the cage 90° so as to bring the bosses into the indentations. It was then necessary to push, by means of an instrument, the nut back towards the bottom of the cage so as to free the lugs from the indentations.

In order to remedy this disadvantage, in accordance with a second aspect of the invention, the cage is no longer cylindrical in revolution but in the form of a truncated cone in revolution, as shown in FIG. 2 (the conicity being greatly exaggerated for the sake of clearness).

Because of this, before the nut is tightened against the metal sheet 13 by means of a bolt, the inner diameter of the cage adjacent its bottom corresponds substantially to the outer diameter of nut 1 (disregarding lugs 2) whereas the inner diameter of the cage adjacent collar 8 is slightly less than the outer diameter of the nut. Thus, whatever the position of the system, nut 1 remains jammed at the bottom of the cage.

When a bolt is screwed into the nut, the axial movement of this latter is possible because of the resilience of the walls of socket 4.

It will be noted that the use of a slightly conical cage is made possible only by the presence of retaining ribs 16 on the sidewalls of said cage.

In fact, in order to allow the cage to be introduced into hole 12, the outer diameter of bottom 6 of the cage is slightly less than the diameter of the hole; all the more reason that its outer diameter in the part situated immediately below the collar should be substantially less than the diameter of the hole because of its conicity. Therefore the presence of retaining rib 16 is indispensable, not only for locking the nut in the bottom of the cage as mentioned above, but also for preventing the cage from coming out of the hole again during its introduction from underneath, in an upside down position, therein.

An apparatus and a process will now be described for manufacturing ribbed cages according to the invention.

The apparatus is intended to be fed with non ribbed cages (obtained for example by cutting out and then by stamping a thin metal sheet).

Figure 3:
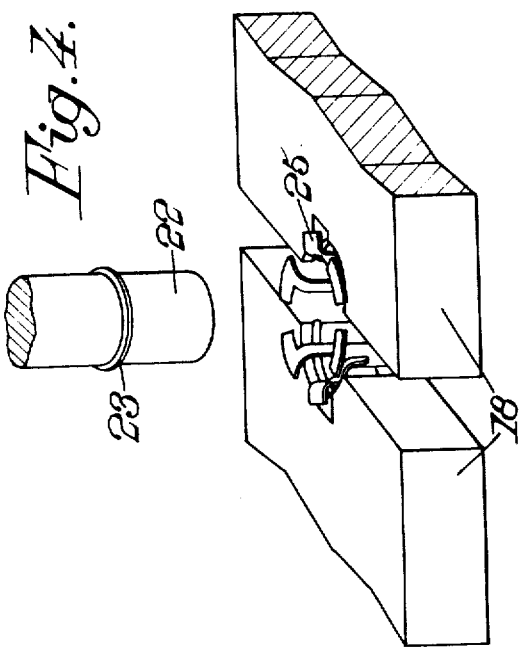
Figure 4:
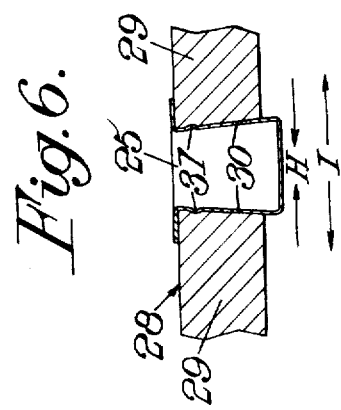
Figure 5:
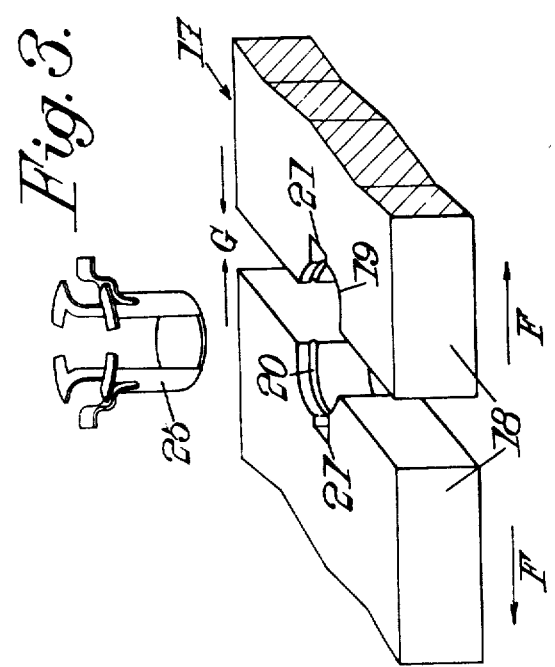

It comprises a first matrix 17, shown in FIGS. 3 to 5 in several operating positions, but which can be best seen in FIG. 3.

This matrix 17 is essentially constituted by two identical half shells 18, arranged and supported so as to be able to be separated from each other along arrows F or, on the contrary, put together in mutual contact (arrows G) by means of an appropriate mechanism (not shown).

The half shells each comprise a semi-cylindrical recess 19 in the internal face of which is provided a semi-annular groove 20. Furthermore, an indentation 21 is formed in the upper edge of each recess so as to receive a corresponding boss of the cage, as will be described hereafter.

When the two half shells are brought into mutual contact, the two recesses 19 form together a cylindrical cavity, in revolution, with an inner diameter adapted for the insertion therein without play of a non ribbed metal cage.

The apparatus comprises also a punch 22 (see FIG. 4) of cylindrical shape, in revolution, and whose diameter is slightly less than the inner diameter of the cage.

This punch carries an annular rib 23 projecting radially outwards, the transverse profile of this rib being complementary (except for the thickness of the sidewalls of the cage) to that rib 20 of the matrix. Furthermore, the axial position of rib 23 on the punch is such that in the working position of punch 22 in matrix 17, rib 23 is situated opposite groove 20.

Punch 22 is movable in relation to the matrix by means of an appropriate device not shown in the figures.

In order to form a rib on a metal cage, already stamped, by means of the apparatus which has just been described, this non ribbed cage 25 is introduced between the two recesses 19 of the two half shells 18 separated from each other (FIG. 3). The cage is positioned axially simply by means of the collar which rests on the edges of the two recesses, bosses 10 being housed in indentations 21.

Punch 22 is then introduced into the cage (FIG. 4); because the diameter of the punch at right angles with the rib is greater than the inner diameter of the cage, the punch must be forced in.

The two half shells 18 of the matrix are then brought into mutual contact (arrows F-FIG. 5), which causes the deformation of the sidewall of the cage trapped between rib 23 of the punch and groove 21 of the matrix.

Then the two half shells 18 are separated from each other (arrows G of FIG. 5) and the punch is withdrawn from the cage.

Because the cage is now ribbed, withdrawal of the punch causes a widening of the cage which, because of the lack of resilience of the metal which has not yet been treated, assumes a substantially truncated cone shape widened at the top, i.e. its inner diameter at the collar is substantially greater than the inner diameter of its bottom.

Figure 6:
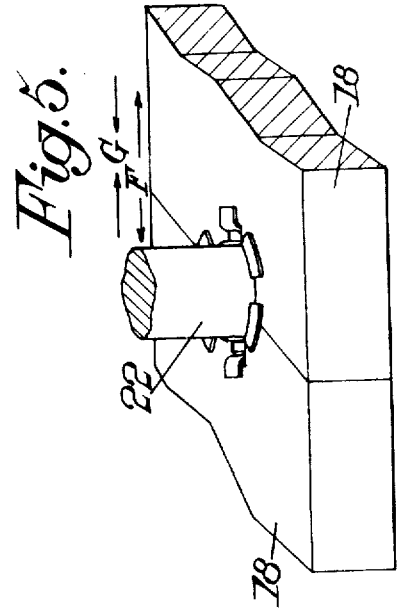

In order to give the cage its final form, i.e. the shape of a truncated cone tapering upwards (the inner diameter at the collar being slightly less than the diameter of the bottom), a second matrix 28 is used shown schematically in FIG. 6.

This matrix 28 is formed from two half shells 29 arranged and supported so as to be able to be separated from each other or brought together into mutual contact by means of a mechanism not shown.

Each half shell is provided with a recess 30 having the shape of a half truncated cone having on its internal face a semi-annular groove 31. Moreover, the edge of the recess comprises an indentation (not visible in the figure) for receiving a corresponding boss of the metal cage.

When the two half shells are brought into mutual contact, the two recesses 30 form together a truncated cone shaped cavity with a widened bottom.

In order to give the ribbed metal cage 25 previously obtained its final shape, the cage is introduced into matrix 28, the two half shells being separated from each other. Then the two half shells are brought together and placed in mutual contact (arrows H in FIG. 6), the ribbed cage 25 assuming then its final shape shown in the figure.

The two half shells are then separated from each other (arrows I in FIG. 6), and the slightly truncated cone shaped ribbed cage is subjected to an appropriate heat treatment (carbonitriding) to harden the metal and to endow it with the resilience required for its use.

As is evident and as it results moreover already from what has gone before, the invention is in no wise limited to those of its modes of application and embodiments which have been more specially considered; it covers, on the contrary, all variations thereof.

I claim:

1. An apparatus for completing a metal cage for a prisoner threaded member-cage system comprising:
- a matrix formed of two adjacent half shells adapted to be brought into contact with each other, each half shell having a semi-cylindrical recess, a semi-annular groove provided in the internal face and at least one indentation in the recess, such that the recesses of said two adjacent half shells form a cylindrical cavity for receiving a metal cage formed from a socket split longitudinally by two windows and provided with two bosses formed from two tabs cut out in the side of the wall of the socket which are received in the indentations of said half shells and the free ends of the two tabs and the side wall being bent back outwardly so as to form a discontinuous collar which rests on said matrix as the socket is received in the recesses;
- a cylindrical punch having an annular rib projecting radially from the surface of said punch at an axial level corresponding to the level of the groove in said matrix; and
- said two adjacent shells of said matrix being moveable towards each other and away from each other after the metal cage has been inserted and located in said matrix and said punch has been inserted in the metal cage such that when the two shells are brought into contact with each other the cooperation between the rib of said punch and the annular groove of said matrix forms an annular rib projecting outwards from the socket wall of the metal cage.

2. An apparatus for completing a metal cage as claimed in claim 1 further comprising a second matrix formed from two adjacent half shells adapted to be brought into contact with each other, each shell having a recess in the shape of a half truncated cone converging upwardly, a semi-annular groove in the internal face of the recess for receiving the rib of the metal cage, and at least one indentation for cooperating with a corresponding boss on the metal cage such that when the two shells of said second matrix are brought together with the socket of the metal cage in the recesses, the socket takes on the shape of a truncated cone converging upwardly.

* * * * *